US012216968B2

(12) United States Patent
Li et al.

(10) Patent No.: US 12,216,968 B2
(45) Date of Patent: Feb. 4, 2025

(54) METHOD FOR IMPLEMENTING ULTIMATE STRENGTH ANALYSIS OF PLATE FRAME STRUCTURE BASED ON ISOGEOMETRIC ANALYSIS

(71) Applicant: SHANGHAI JIAO TONG UNIVERSITY, Shanghai (CN)

(72) Inventors: Chuntong Li, Shanghai (CN); Deyu Wang, Shanghai (CN); Guijie Shi, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 0 days.

(21) Appl. No.: 18/732,451

(22) Filed: Jun. 3, 2024

(65) Prior Publication Data
US 2024/0411955 A1 Dec. 12, 2024

(30) Foreign Application Priority Data

Jun. 8, 2023 (CN) .......................... 202310676160.7

(51) Int. Cl.
*G06F 30/20* (2020.01)
*G06F 30/10* (2020.01)
*G06F 111/10* (2020.01)

(52) U.S. Cl.
CPC .............. *G06F 30/20* (2020.01); *G06F 30/10* (2020.01); *G06F 2111/10* (2020.01)

(58) Field of Classification Search
CPC ...... G06F 30/20; G06F 30/10; G06F 2111/10; G06F 30/23; G06F 30/28; G06F 17/17; G06T 17/30; G06T 17/20
See application file for complete search history.

(56) References Cited

U.S. PATENT DOCUMENTS 6,876,956 B1 * 4/2005 Cirak ...................... G06F 30/23
703/2
7,392,163 B1 6/2008 Bindeman
(Continued)

FOREIGN PATENT DOCUMENTS

| CN | 112035980 A | 12/2020 |
| CN | 115862771 A | 3/2023 |
| CN | 116011301 A | 4/2023 |

OTHER PUBLICATIONS

L. Yin, F. Zhang, X. Deng, P. Wu, H. Zeng and M. Liu, "Isogeometric Bi-Directional Evolutionary Structural Optimization," in IEEE Access, vol. 7, pp. 91134-91145, 2019, doi: 10.1109/ACCESS.2019.2927820. (Year: 2019).*

(Continued)

*Primary Examiner* — Charles L Beard
(74) *Attorney, Agent, or Firm* — Pilloff Passino & Cosenza LLP; Rachel Pilloff; Sean Passino

(57) ABSTRACT

Ship structural ultimate bearing analysis and design research is involved. A method for implementing ultimate strength analysis of plate frame structure based on isogeometric analysis includes the following steps: according to the plate frame structure, constructing an IGA model, wherein the IGA model comprises several plane shell elements; carrying out a coordinate transformation on the plane shell elements; carrying out a weak coupling on boundaries of transformed plane shell elements by Nitsche method and carrying out a mesh refinement; setting material properties, loads and boundary conditions of refined plane shell elements, and constructing a nonlinear equation according to setting results; and solving the nonlinear equation by Newton-Raphson iteration method, and carrying out a simulation analysis by NX software to obtain an ultimate strength of the plate frame structure.

6 Claims, 7 Drawing Sheets

(56) References Cited

U.S. PATENT DOCUMENTS

| | | | | |
|---|---|---|---|---|
| 8,284,193 | B2* | 10/2012 | Hanisch | G06T 17/30 345/442 |
| 10,915,678 | B1* | 2/2021 | Schafstall | G06F 17/13 |
| 11,341,294 | B2* | 5/2022 | Andrade | G06F 30/20 |
| 11,501,032 | B2* | 11/2022 | Zhou | G06F 3/00 |
| 11,977,823 | B2* | 5/2024 | Cheng | G06F 30/17 |
| 2009/0024370 | A1* | 1/2009 | Scott | G06F 30/15 703/2 |
| 2009/0303235 | A1* | 12/2009 | Maekawa | G06T 17/205 382/300 |
| 2010/0049451 | A1* | 2/2010 | Lu | G01N 3/12 702/42 |
| 2012/0191423 | A1* | 7/2012 | Dokken | G06T 17/30 703/1 |
| 2012/0310604 | A1* | 12/2012 | Bazilevs | G06F 30/23 703/1 |
| 2015/0178424 | A1* | 6/2015 | Harkness | G06F 30/23 703/1 |
| 2016/0275207 | A1* | 9/2016 | Qian | G06T 17/205 |
| 2017/0018118 | A1* | 1/2017 | Li | G06F 30/23 |
| 2018/0261008 | A1* | 9/2018 | Elber | G06T 17/10 |
| 2018/0365371 | A1* | 12/2018 | Urick | G06F 30/15 |
| 2019/0130058 | A1* | 5/2019 | Thomas | G06F 30/15 |
| 2019/0130642 | A1* | 5/2019 | Elber | G06T 17/10 |
| 2019/0155986 | A1* | 5/2019 | Schmitter | G06F 30/13 |
| 2019/0251218 | A1* | 8/2019 | Schmitter | G06F 30/23 |
| 2019/0385366 | A1* | 12/2019 | Sederberg | G06T 17/30 |
| 2020/0207024 | A1* | 7/2020 | Morris | B29C 70/38 |
| 2021/0141869 | A1* | 5/2021 | Bächer | G06F 30/20 |
| 2021/0232736 | A1* | 7/2021 | Zhang | G06F 30/23 |
| 2021/0240159 | A1* | 8/2021 | Taber | B29C 64/386 |
| 2022/0067241 | A1* | 3/2022 | Scott | G06F 30/23 |
| 2022/0382933 | A1* | 12/2022 | Frambati | G06F 30/28 |
| 2023/0120926 | A1* | 4/2023 | Thomas | G06F 30/23 703/1 |
| 2023/0394768 | A1* | 12/2023 | Wang | G06T 17/30 |
| 2024/0020434 | A1* | 1/2024 | Urick | G06T 19/20 |
| 2024/0153123 | A1* | 5/2024 | Wang | G06T 17/20 |
| 2024/0185028 | A1* | 6/2024 | Liu | G06N 3/096 |
| 2024/0193324 | A1* | 6/2024 | Suresh | G06F 30/23 |

OTHER PUBLICATIONS

J. Gao, H. Li, Z. Luo, P. Li and L. Gao, "Isogeometric Density Field Method for Topology Optimization of Micro-architected Materials," 2019 IEEE 23rd International Conference on Computer Supported Cooperative Work in Design (CSCWD), Porto, Portugal, 2019, pp. 524-529, doi: 10.1109/CSCWD.2019.8791502. (Year: 2019).*

M. Fays, O. Chadebec and B. Ramdane, "Isogeometric FEM-BEM Coupling for Magnetostatic Problems Modeling Using Magnetic Scalar Potential," in IEEE Transactions on Magnetics, vol. 59, No. 5, pp. 1-4, May 2023, Art No. 7001104, doi: 10.1109/TMAG.2023.3244100. (Year: 2023).*

A. Schollmeyer and B. Froehlich, "Direct Isosurface Ray Casting of NURBS-Based Isogeometric Analysis," in IEEE Transactions on Visualization and Computer Graphics, vol. 20, No. 9, pp. 1227-1240, Sep. 1, 2014, doi: 10.1109/TVCG.2014.2327977. (Year: 2014).*

X. Yuan and W. Ma, "Isogeometric Analysis Based on a Set of Truncated Interpolatory Basis Functions," 2013 International Conference on Computer-Aided Design and Computer Graphics, Guangzhou, China, 2013, pp. 274-281, doi: 10.1109/CADGraphics.2013.43. (Year: 2013).*

A. Ziegler, N. Georg, W. Ackermann and S. Schöps, "Mode Recognition by Shape Morphing for Maxwell's Eigenvalue Problem in Cavities," in IEEE Transactions on Antennas and Propagation, vol. 71, No. 5, pp. 4315-4325, May 2023, doi: 10.1109/TAP.2023.3249907. (Year: 2023).*

Zhang Dongliang et al., Nonlinear dynamic analysis for cables based on the isogeometric collocation method. Journal of Huazhong University of Science and Technology (Natural Science Edition), vol. 44, No. 12. Date of issue: Dec. 31, 2016 pp. 1-6 (doi: 10.13245/j. hust. 161201) Related claims: 1-6.

Notification to Grant Patent Right for Invention dated Mar. 16, 2024 from SIPO application No. 202310676160.7.

First Office action dated Feb. 1, 2024 from SIPO application No. 202310676160.7.

First Search report dated Jan. 31, 2024 from SIPO application No. 202310676160.7.

Second Search report dated Mar. 11, 2024 from SIPO application No. 202310676160.7.

* cited by examiner

METHOD FOR IMPLEMENTING ULTIMATE STRENGTH ANALYSIS OF PLATE FRAME STRUCTURE BASED ON ISOGEOMETRIC ANALYSIS

CROSS-REFERENCE TO RELATED APPLICATIONS

This application claims priority to Chinese Patent Application No. 202310676160.7, filed on Jun. 8, 2023, the contents of which are hereby incorporated by reference.

TECHNICAL FIELD

The application relates to the technical field of ship structural mechanics, and in particular to the technical field of ship structural ultimate bearing analysis and design research, and in particular to a method for implementing ultimate strength analysis of plate frame structure based on isogeometric analysis.

BACKGROUND

Finite element method (FEM) has been widely used in hull structure analysis, vibration analysis and many other aspects in the past ten years because of its stability, universality and accuracy. The standard process is: creating geometric model-creating analytical model-solving equilibrium equation-postprocessing. Due to the complexity of hull structure, geometric models often need to be created in computer aided design (CAD) system, and then imported into computer aided engineering (CAE) system for analysis. Meanwhile, complex preprocessing such as meshing increases the complexity of the application. Non-uniform rational B-spline function (NURBS) is often used to express the geometric shape accurately in CAD geometric models. The meshing of conventional FEM leads to the separation of geometric modeling and analysis.

Different from conventional FEM, isogeometric analysis (IGA) uses higher-order spline basis functions such as NURBS spline as shape functions to construct elements and discrete computational domains. Similar to FEA, the idea of discrete Galerkin method and isoparametric element is adopted. The construction and analysis process of IGA model includes the construction of isoparametric model, the transformation relation of discrete mesh coordinates needed to solve integration, the method of mesh refinement and patch coupling, the definition of load and boundary conditions and the solution of integration, etc. The geometric model created in mainstream CAD software may be directly used for numerical analysis without meshing.

Because of the high-order continuity of shape function, C1 continuous elements, such as C1 continuous Kirchhoff-Love shell element and Euler-Bernoulli beam element, which are difficult to construct in conventional FEM, may be easily constructed in IGA, which makes IGA surface patch have the potential of coupling nonconforming meshes with high accuracy and without manual repair of geometric defects. These advantages make IGA get wide attention since it was put forward, and IGA has developed rapidly. However, at present, IGA may not replace FEM, and its research mostly stays in the theoretical verification stage and linear analysis stage of simple structure. At this stage, it is necessary to break through the nonlinear solution problem of IGA bearing on plate frame structure.

SUMMARY

In order to solve the problems existing in the prior art, the present application provides a method for implementing ultimate strength analysis of plate frame structure based on isogeometric analysis, proposes a nonlinear analysis method of ultimate strength of hull structure by combining with the characteristics of hull structure, and studies the uncoordinated multi-patch coupling technology in IGA, so as to solve the common problems of difficult geometric defect treatment and complex modeling in hull structure analysis using conventional FEM, so as to help designers intuitively understand and deeply understand the mechanical characteristics of the structure and the failure mechanism of the ultimate bearing capacity of the structure.

In order to achieve the above technical objectives, the application provides the following technical scheme: a method for implementing ultimate strength analysis of plate frame structure based on isogeometric analysis, including the following steps:

according to the plate frame structure, constructing an IGA model, where the IGA model includes several plane shell elements;

carrying out a coordinate transformation on the plane shell elements;

carrying out a weak coupling on boundaries of transformed plane shell elements by Nitsche method and carrying out a mesh refinement;

setting material properties, loads and boundary conditions of refined plane shell elements, and constructing a nonlinear equation according to setting results; and solving the nonlinear equation by Newton-Raphson iteration method, and carrying out a simulation analysis by NX software to obtain an ultimate strength of the plate frame structure.

Optionally, constructing the IGA model based on a B-spline curve, where the plane shell elements are constructed based on Reissner-Mindlin shell theory;

wherein the B-spline curve is defined as:

$$C(\xi) = \frac{\sum_{i=1}^{n} B_{i,p}(\xi)\omega_i P_i}{\sum_{i=1}^{n} B_{i,p}(\xi)\omega_i} = \sum_{i=1}^{n} N_{i,p}(\xi)\omega_i P_i \quad 0 \leq \xi \leq 1$$

where $P_i(i=1, 2, \ldots, n)$ represents coordinates of a series of the control points, and $\omega_i$ represents a corresponding control point weight; a geometric shape of a structure is modified by changing the coordinates or weights of the control points; $B_{i,p}(\xi)$ and $N_{i,p}(\xi)$ represent spline basis functions in the node vector $\Xi=\{\xi_1, \xi_2, \ldots, \xi_m\}$ respectively, and node vector $\Xi=\{\xi_1, \xi_2, \ldots, \xi_m\}$ is a set of non-decreasing real number sequence; and the plane shell element include torsional degrees of freedom and have 6 degrees of freedom.

Optionally, the coordinate transformation is carried out through four kinds of coordinate systems, including global Cartesian coordinate system, local Cartesian coordinate system from control points, parametric coordinate system and local coordinate system at Gaussian integration.

Optionally, when the boundary conditions are imposed by the Nitsche method, carrying out a correction by setting Lagrange multiplier and adding a penalty function, wherein the functional expression of the Nitsche method is defined as:

$$\prod\nolimits^* = -\int_\Gamma R \times (A-G)dS + \frac{r}{2}\int_\Gamma (A-G)^2 dS;$$

where, R is generalized force on the boundaries, A is generalized displacement on the boundaries, G is boundary conditions, r is stability coefficient, $\Gamma$ is coupling boundary, and S is element area.

Optionally, the mesh refinement adopts h mesh refinement and is realized by adding the control points.

Optionally, the nonlinear equation includes:
a unit displacement increment is: $\Delta u = R_e \Delta d_e$;
$R_e$ is a shape function matrix, and $\Delta d_e$ is the displacement matrix of the control points;
a strain increment is $\Delta E = \Delta E^L + \Delta E^N$;
where $\Delta EL$ is a linear strain increment and $\Delta EN$ is a nonlinear strain increment; and
a stress increment is $\Delta T = C_{sh} \Delta E$, and Csh is the global elastic coefficient matrix.

Optionally, a process of carrying out the simulation analysis by the NX software includes:

according to the plate frame structure, obtaining element information and design information of a geometric model, where the element information of the geometric model includes an order of basic functions, node vectors, control point coordinates and weights; the design information includes node vectors, element number information, topological relationship between elements and nodes and normal vectors of the control points;

constructing the geometric model through the element information and the design information, and traversing the elements corresponding to all the node vectors of the geometric model circularly, and calculating an element stiffness matrix in a corresponding local Cartesian coordinate system;

obtaining a local coordinate system of Gaussian integral points of the nodes, calculating a global elastic coefficient matrix, obtaining a Jacobi matrix corresponding to the nodes, calculating a strain displacement matrix according to the global elastic coefficient matrix and the Jacobi matrix, and calculating and obtaining an element stiffness matrix in the global Cartesian coordinate system according to the strain displacement matrix;

connecting and assembling the element stiffness matrix in the global Cartesian coordinate system into an overall stiffness matrix; and according to a material and the nonlinear equation of the plate frame structure, constructing a nonlinear solution algorithm by using an incremental step length dynamic calculation mode, and obtaining the ultimate strength of the plate frame structure by solving the nonlinear equation through the nonlinear solution algorithm.

Optionally, the incremental step length dynamic calculation mode is as follows:

according to the incremental step length, carrying out an incremental step length loop, the initializing related variables and matrices in an operation calculation of the NX software, and entering an iterative loop, where the incremental step length is obtained by presetting or calculating;

in the iterative loop, calculating the element stiffness matrix and an initial stress node force matrix in the global Cartesian coordinate system one by one in the geometric model, and connecting and assembling into the overall stiffness matrix and a global initial stress node force matrix respectively; where in a calculation process of the element stiffness matrix and the initial stress node force matrix, obtaining the element stiffness matrix and the initial stress node force matrix in the global Cartesian coordinate system by using reduced integral and based on the global elastic coefficient matrix and the strain displacement matrix obtained by the calculation;

according to the overall stiffness matrix and the global initial stress node force matrix, calculating displacement increments;

carrying out an isogeometric nonlinear iteration based on the nonlinear equation to judge whether convergence conditions are met, and if the convergence conditions are met, outputting all the displacement increments, namely the ultimate strength of the plate frame structure; where the convergence conditions are: the incremental step length is equal to a maximum load, an iterations is less than a maximum iterations, and an incremental step length split time is less than a maximum split time.

Optionally, when the boundary condition is $\Gamma$ in a three-dimensional space $\Omega$, a corresponding element stiffness matrix Ke and an element force vector matrix Fe are:

$$K_e = \int_{\Omega_e} B^T D B |J_v| d\Omega_e$$

$$F_e = \int_{\Omega_e} R^T b |J_v| d\Omega_e + \int_{\Gamma_e} R_t^{T^-} |J_s| d\Gamma_e$$

wherein B is a displacement differential matrix, R is a local strain matrix, D is a fourth-order tensor of elastic modulus, $B^T$ and $R^T$ respectively denote a matrix transposition of the matrices B and R, and Jv and Js are Jacobi matrices of a body and a surface respectively, and b and t are given external force vectors.

The application has the following technical effects.

First, the application provides a method for implementing ultimate strength analysis of plate frame structure based on isogeometric analysis, and provides a method for acquiring the ultimate strength of a ship plate frame structure based on isogeometric analysis.

Second, the method for implementing ultimate strength analysis of plate frame structure based on isogeometric analysis provided by the application may obtain the displacement distribution of the structure in real time, and may provide effective support for the safety design and evaluation of the structure.

Third, the method for implementing ultimate strength analysis of plate frame structure based on isogeometric analysis provided by the application may not only provide assistance for engineering designers, but also be applied to the teaching supplement of the course of Ship Structure Dynamics in colleges and universities, so as to improve students' understanding and mastery of professional theoretical knowledge.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

Figure 1:
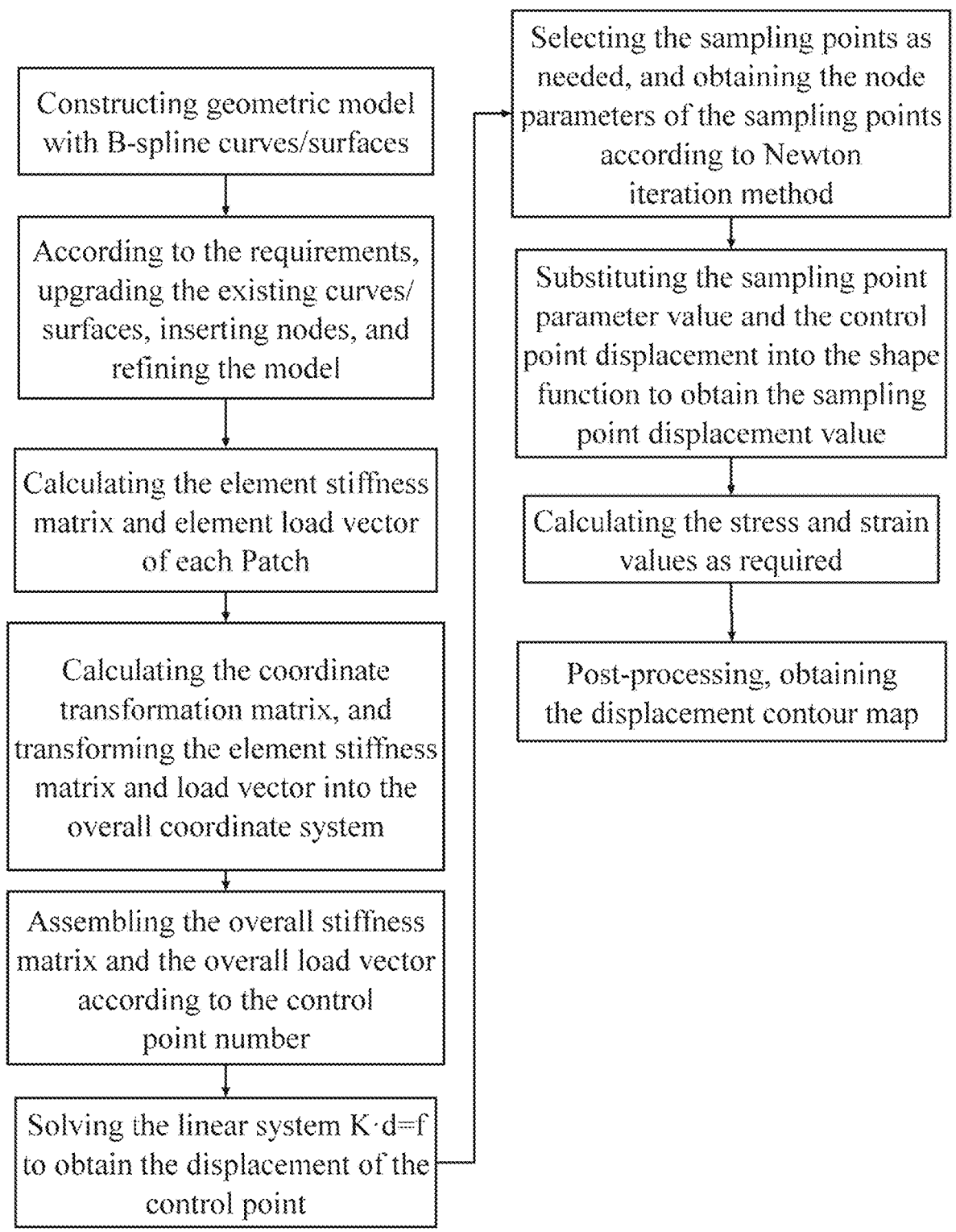
FIG. 1 is a schematic flow chart of the method provided by an embodiment of the present application.

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

The application discloses a method for implementing ultimate strength analysis of plate frame structure based on isogeometric analysis, which includes the following steps: The construction method includes building a plane shell element based on Reissner-Mindlin shell theory, coordinate transformation, weak coupling based on Nitsche method elements, mesh refinement, definition of material properties and boundary conditions, Newton-Raphson iteration method for solving nonlinear equations, program realization based on NX software. The core of the implementing method is that the geometric model expressed in the CAD system may be directly inherited by taking the B-spline function as the discrete calculation domain of the shape function, and the geometric model does not need to be discretized for the second time, so that the meshing stage is skipped and the preprocessing stage of the meshing is omitted. Finally, the integration of model construction and numerical analysis is realized through the secondary development of NX software. By embedding the self-developed mesh refinement and coupling program and Newton-Raphson iteration algorithm program, the application overcomes the complicated pretreatment in conventional finite element analysis, is suitable for ship plate structure with general boundary conditions, and is suitable for geometric nonlinear large deformation analysis, and has higher calculation efficiency and strong engineering applicability compared with conventional numerical algorithms such as finite element.

The application relates to a method for implementing ultimate strength analysis of plate frame structure based on isogeometric analysis, which includes the processes such as construction of plane shell elements based on Reissner-Mindlin shell theory (shell elements are constructed based on control points and spline functions), the weak coupling of elements based on Nitsche method (boundary conditions of discrete mesh elements, coupling modes between beam elements and plate elements, and plate elements and plate elements are defined), mesh refinement (adding nodes and refining discrete meshes to submit the solution accuracy), Newton-Raphson iteration method (a nonlinear calculation method consistent with finite element numerical simulation) to solve nonlinear equations, and program realization based on NX software.

As some embodiments, the construction platform of the method framework is NX software, which is developed in C++ language. In this method, a nonlinear analysis method for implementing ultimate strength analysis of plate frame structure is proposed.

As some embodiments, the B-spline is the basis of geometric modeling and IGA modeling, and the definition of B-spline curve is:

$$C(\xi) = \frac{\sum_{i=1}^{n} B_{i,p}(\xi)\omega_i P_i}{\sum_{i=1}^{n} B_{i,p}(\xi)\omega_i} = \sum_{i=1}^{n} N_{i,p}(\xi)\omega_i P_i \quad 0 \le \xi \le 1$$

where $P_i$(i=1, 2, . . . , n) represents coordinates of a series of the control points, and $\omega_i$ represents corresponding control point weight; a geometric shape of a structure is modified by changing the coordinates or weights of the control points; $B_{i,p}(\xi)$ and $N_{i,p}(\xi)$ represent spline basis functions in a node vector $\Xi=\{\xi_1, \xi_2, \ldots, \xi_m\}$ respectively, and the node vector $\Xi=\{\xi_1, \xi_2, \ldots, \xi_m\}$ is a set of non-decreasing real number sequence.

As some embodiments, the Reissner-Mindlin plane shell element is different from Kirchhoff-Love shell element only in bending stiffness, and the membrane part is the same. This method adopts Reissner-Mindlin plane shell element to consider membrane strain and shear strain.

As some embodiments, the Reissner-Mindlin plane shell element must have torsional degrees of freedom if it wants to make multi-patch modeling IGA, and each node of the Reissner-Mindlin plane shell element has 6 degrees of freedom.

As some embodiments, the weak coupling method based on Nitsche method element mainly considers Timoshenko beam element, six degrees of freedom exist independently, and the B-spline function has non-interpolation, and the Nitsche method is still needed to impose boundary conditions, and the Nitsche method is used to realize the boundary coupling between beam and plate, and between plates.

As some embodiments, the mesh refinement refers to inserting new nodes between control nodes to improve the internal mesh density and ensure the calculation accuracy.

As some embodiments, the Newton-Raphson iteration method is the same as the conventional finite element analysis method. In this method, the incremental step length dynamic calculation mode is used to realize the nonlinear solution algorithm in the process of solving the nonlinear equation by Newton-Raphson iteration method.

As some embodiments, the coordinate transformation involves the use of four coordinate systems, which are different from the two coordinate systems adopted by the conventional finite element method. The four coordinate systems include a global Cartesian coordinate system, a local Cartesian coordinate system at a control point, a parametric coordinate system and a local coordinate system at a Gaussian integral point, which are described as follows:

1) Global Cartesian Coordinate System [x, y, z]: in CAD software, the geometric model is defined in this coordinate system, including the coordinates of control points, translational degrees of freedom of control points and translational displacement in displacement interpolation function.

2) The local Cartesian coordinate system $[^0V_1^k, {}^0V_2^k, {}^0V_n^k]$ at a control point: k represents the k-th control point, and in this coordinate system, the rotational degrees of freedom $\alpha_k$, $\beta_k$ of the control point is defined, and the displacement caused by normal vector rotation in the displacement interpolation function.

3) Parametric coordinate system [r, s, t]: in this coordinate system, NURBS basis function, namely interpolation function, is defined, so as to interpolate coordinates and displacements in the element.

4) Local coordinate system [$t_1$, $t_2$, n] at Gaussian integral point: in the constitutive equation, the global elastic coefficient matrix is converted from local elastic coefficient, and the conversion matrix is obtained from the direction cosine of the coordinate system at Gaussian integral point and the global coordinate system.

As some embodiments, when the Nitsche method applies the membrane element boundary conditions, the functional modification may be completed by identifying Lagrange multiplier and adding penalty function terms as follows:

$$\prod_m = \frac{1}{2}\int_\Omega \nabla u \cdot \nabla u - u \cdot f d\Omega - \int_{\Gamma_d} \nabla u \cdot n_s \cdot (u-g) dS + \frac{a_m}{2}\int_{\Gamma_d}(u-g)^2 dS,$$

where u is the displacement, g is the boundary condition, $a_m$ is the stability coefficient, $n_s$ is the outer normal direction on the boundary, S is the element area, and $\nabla(\cdot)$ is the Hamiltonian operator.

The functional of Nitsche method may be abbreviated as:

$$\prod{}^* = -\int_\Gamma R \times (A-G) dS + \frac{r}{2}\int_\Gamma (A-G)^2 dS,$$

where R is the generalized force on the boundary, A is the generalized displacement on the boundary, G is the boundary condition, and r is the stability coefficient.

As some embodiments, the general formula of the Nitsche method is:

$$\prod = \sum_{i=1}^{2} U_i - \int_\Gamma 2 \cdot (\gamma R^{(1)} + (1-\gamma) R^{(2)}) \times (A^{(1)} - A^{(2)}) dS + a\int_\Gamma (A^{(1)} - A^{(2)})^2 dS,$$

where $U_i$ is the original potential energy functional of the coupled surface patch, $\Gamma$ is the coupling boundary, a is the stability coefficient, $R^{(i)}$ and $A^{(i)}$(i=1, 2) are the generalized force and generalized displacement of the i-th surface patch to be coupled, and $\gamma\in[0,1]$ is the coefficient to be determined, which represents the importance of the coupling sides to the boundary.

As some embodiments, the mesh refinement strategy is h refinement, which is realized by adding control points.

As some embodiments, the nonlinear iterative process adopts the incremental step length dynamic calculation mode to construct a complete solution algorithm. Using incremental step length dynamic calculation mode has many judging conditions and complicated program design. However, this method may reasonably adjust the size of incremental step according to the calculation results, realize the dynamic change of incremental step in the whole calculation process, and avoid manual blind debugging, thus improving convergence speed and calculation efficiency.

As some embodiments, compared with conventional FEA, the main difference of geometric analysis solution lies in model establishment and postprocessing, and the main steps and program design are as follows:

step (1): according to the geometric characteristics of the model, the basic function order, node vectors, control point coordinates, weights and other essential element information for establishing the geometric model, the node vectors, element number information, topological relations between elements and nodes, normal vectors of control points and the like are obtained through a design program;

step (2): the element loop is entered to traverse all the elements in the node vectors and calculate the element stiffness matrix in the local coordinate system;

step (3): the loop of Gaussian integral point is entered to take the element stiffness matrix in the local coordinate system at the Gaussian integral point and then calculate the global elastic coefficient matrix Csh, calculate the Jacobi matrix J and then calculate the strain displacement matrix Be, and finally obtain the element stiffness matrix ke in the global Cartesian coordinate system;

step (4): the element tangential stiffness matrix is assembled into the overall stiffness matrix K according to the element connection information; and step (5): considering the nonlinear problems of materials and geometry, a complete nonlinear solution algorithm is constructed by using the incremental step length dynamic calculation mode; the main steps and program design of incremental iteration are as follows:

1): under the premise of meeting the loop condition, according to the set incremental step length or the calculated dynamic incremental step length, the program enters an incremental step loop, and after initializing related variables and matrices, the program enters an iterative loop;

2): in the iterative loop, the stiffness matrix and the initial stress node force matrix are calculated element by element and assembled into the corresponding global matrix; in order to eliminate the shear locking effect, it is necessary to calculate the global elastic coefficient matrix, strain displacement matrix, and then obtain the element stiffness matrix and the initial stress node force matrix;

3): according to the global tangential stiffness matrix and the global initial stress node force matrix, the displacement increment is calculated through the stiffness, strain and stress constitutive equations;

4): isogeometric nonlinear iteration is performed to judge whether converging or not; and 5): during the running of the program, when the incremental step length is equal to the maximum load, the iterations is less than the set maximum iterations, and when the incremental step length split times is less than the set maximum split times, the calculation results of the program meet the convergence conditions.

As some embodiments, the operation process is realized by C++ language, and secondary development is carried out based on NX software to complete the whole process of modeling, analysis and calculation, and the operation process is universal, and different computer languages may be used.

Figure 2:
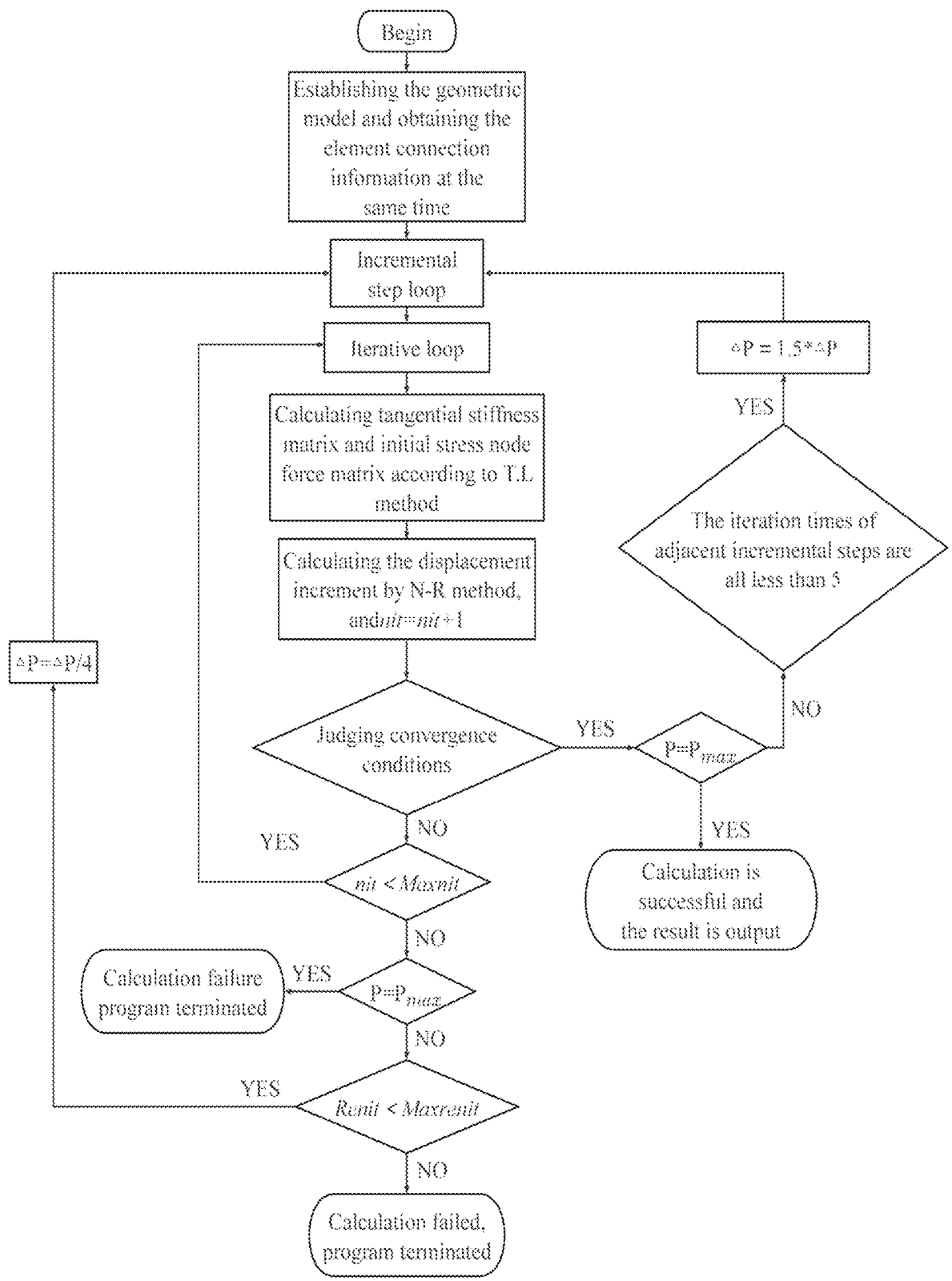
FIG. 2 is a program design framework diagram of geometric nonlinear analysis of Reissner-Mindlin shell provided by an embodiment of the present application.

The above contents are described in detail with the attached drawings and specific implementation contents:

the flow chart of the method of the present application is shown in FIG. 1, and FIG. 2 is a program design framework diagram of geometric nonlinear analysis of Reissner-Mindlin shell, where nit is the iterations, Maxnit is the maximum iterations, P is the load of the current incremental step, Pmax is the applied load, P is the load increment, Renit is the number of dichotomy of incremental load, and Maxnit is the maximum number of splitting method.

(1) Plane Shell Element Construction and Coordinate Transformation of Reissner-Mindlin Shell Theory:

NURBS spline basis function is used to construct CAD geometric model, and is also used as interpolation shape function for CAE numerical analysis. The NURBS curve is defined as:

$$C(\xi) = \frac{\sum_{i=1}^{n} B_{i,p}(\xi)\omega_i P_i}{\sum_{i=1}^{n} B_{i,p}(\xi)\omega_i} = \sum_{i=1}^{n} N_{i,p}(\xi)\omega_i P_i \quad 0 \leq \xi \leq 1,$$

where $P_i$ (i=1, 2, ..., n) is the coordinates of a series of control points, and $\omega_i$ represents corresponding control point weight; a geometric shape of a structure is modified by changing the coordinates or weights of the control points; $B_{i,p}(\xi)$ and $N_{i,p}(\xi)$ represent spline basis functions in the node vector $\Xi=\{\xi_1, \xi_2, \ldots, \xi_m\}$ respectively, and node vector $\Xi=\{\xi_1, \xi_2, \ldots, \xi_m\}$ is a set of non-decreasing real number sequence, and the number of vectors is m=n+p+1.

The i-th spline basis function $B_{i,p}(\xi)$ is defined as:

$$B_{i,p}(\xi) = \frac{(\xi - \xi_i)B_{i,p-1}(\xi)}{\xi_{i+p} - \xi_i} + \frac{(\xi_{i+p+1} - \xi)B_{i+1,p-1}(\xi)}{\xi_{i+p+1} - \xi_{i+1}}$$

$$B_{i,0}(\xi) = \begin{cases} 1 & \xi_i \leq \xi \leq \xi_{i+1} \\ 0 & \text{Otherwise} \end{cases}$$

A NURBS surface is constructed by a two-parameter NURBS basis function, for example, the control points based on node vectors $\Xi_1=\{\xi_1, \xi_2, \ldots, \xi_i\}$ and $\Xi_2=\{\eta_1, \eta_2, \ldots, \eta_m\}$, $P_{i,j}$ and weight $\omega_{i,j}$ are given, the NURBS surface basis function is:

$$S(\xi, \eta) = \frac{\sum_{i=1}^{n_1} \sum_{j=1}^{n_2} B_{i,p}(\xi) B_{j,p}(\eta) \omega_{i,j} P_{i,j}}{\sum_{l=1}^{n_1} \sum_{m=1}^{n_2} B_{l,p}(\xi) B_{m,q}(\eta) \omega_{l,m}},$$

where $B_{i,p}(\xi)$ and $B_{j,p}(\xi)$ are the NURBS basis function in two directions respectively, $P_{i,j}$ and $\omega_{l,m}$ are the coordinate and weight of the control point. $\Xi_1=\{\xi_1, \xi_2, \ldots, \xi_i\}$ $\Xi_2=\{\eta_1, \eta_2, \ldots, \eta_m\}$ and $\Xi_3=\{\zeta_1, \zeta_2, \ldots, \zeta_n\}$ construct NURBS entity to realize the model construction;

$$V(\xi, \eta, \zeta) = \frac{\sum_{i=1}^{n_1} \sum_{j=1}^{n_2} \sum_{k=1}^{n_3} B_{i,p}(\xi) B_{j,p}(\eta) B_{k,r}(\zeta) \omega_{i,j,k} P_{i,j,k}}{\sum_{l=1}^{n_1} \sum_{m=1}^{n_2} \sum_{n=1}^{n_3} B_{l,p}(\xi) B_{m,q}(\eta) B_{n,r}(\zeta) \omega_{l,m,n}},$$

where $B_{i,p}(\xi)$, $B_{j,p}(\eta)$ and $B_{k,r}(\zeta)$ are the basis functions in x, y and z directions of the global Cartesian coordinate system, and $\omega_{i,j,k}$ and $P_{i,j,k}$ are the weight and coordinate of $n_1 \times n_2 \times n_3$ control points.

Figure 4:
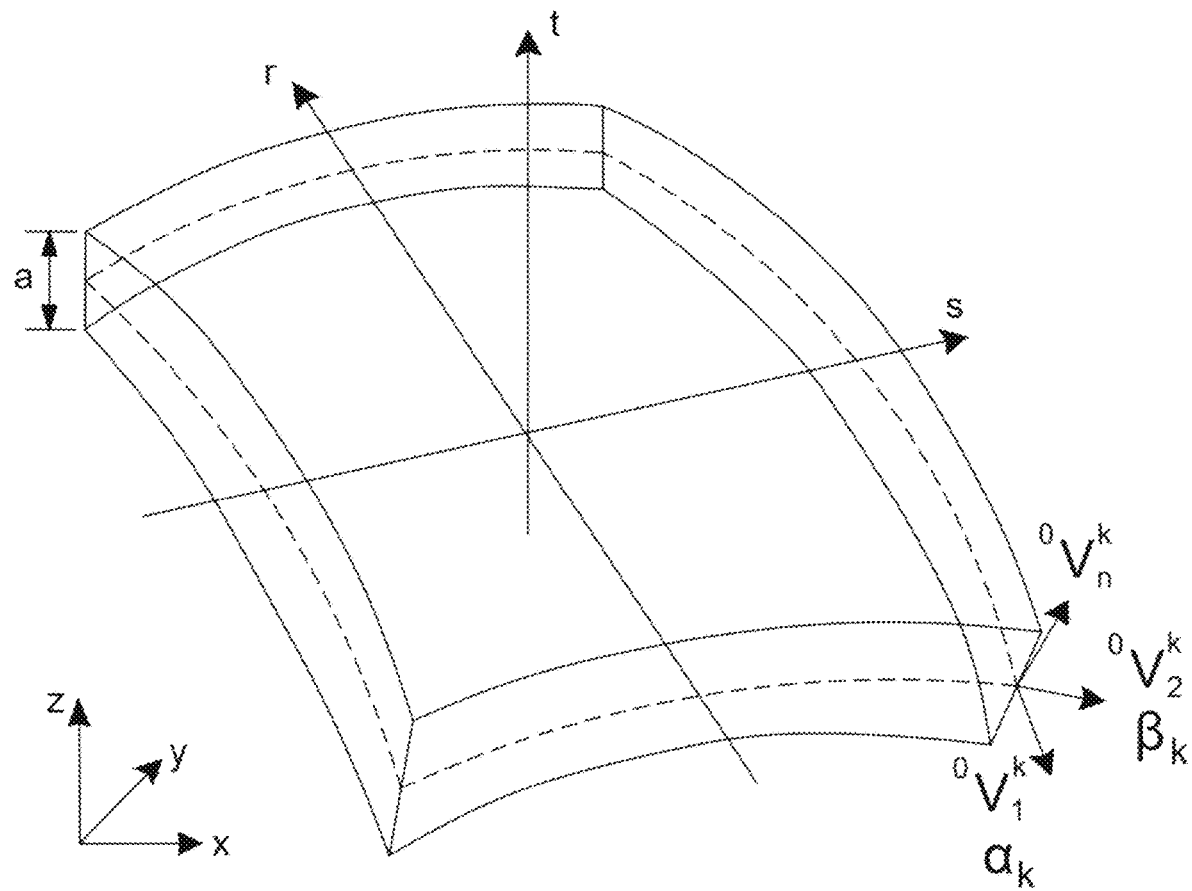
FIG. 4 is a schematic diagram of a Reissner-Mindlin shell model provided by an embodiment of the present application.

It is assumed that the shell model has a constant thickness $\alpha$ (as shown in FIG. 4, and the dotted area is the middle plane of the shell, which is the normal of the control point), and the material is linear elastic isotropic material. The global Cartesian coordinates of a point in the element are:

$$^l x(r, s, t) = \sum_{k=0}^{q} R_k(r, s)^l x_k + \frac{t}{2} \sum_{k=0}^{q} a_k R_k(r, s)^l V_n^k,$$

where r, s and t are parametric coordinate systems, t is the parametric coordinate in the shell thickness direction, $^l X$ is the global Cartesian coordinate of any point in the shell element; k is the control point of the element, k=0~q, q is the number of control points of the element; $^l x_k$ is the global Cartesian coordinate of the control point k; $a_k$ is the thickness of the shell in the direction t, $a_k$=a; $R_k(r, s)$ is the parameter coordinate system corresponding to the two-dimensional NURBS basis function; $^l V_n^k$ is the element vector of the control point k at the middle plane projection point, perpendicular to the middle plane of the shell, that is, the local coordinate system where the normal vector corresponds to the Gaussian integral point; the left superscript l indicates the configuration of the element, l=0 indicates the initial configuration, and l=1 indicates the final configuration.

The element displacement field is expressed by the coordinate difference between the final configuration (after deformation) and the initial configuration (before deformation):

$$u(r, s, t) = \sum_{k=0}^{q} R_k(r, s) u_k + \frac{t}{2} \sum_{k=0}^{q} a_k R_k(r, s) V_n^k,$$

where u is the displacement of any point in the shell element (element displacement increment); $u_k$ is the displacement of the control point; $V_n^k$ is the local coordinate system where the increment of the direction cosine corresponds to the Gaussian integral point, that is, $V_n^k = {}^1V_n^k - {}^0V_n^k$.

$V_n^k$ may be represented by the rotation angle of ${}^0V_n^k$ at control point k.

(2) Parameter Space and Basic Control Equation

Figure 3:
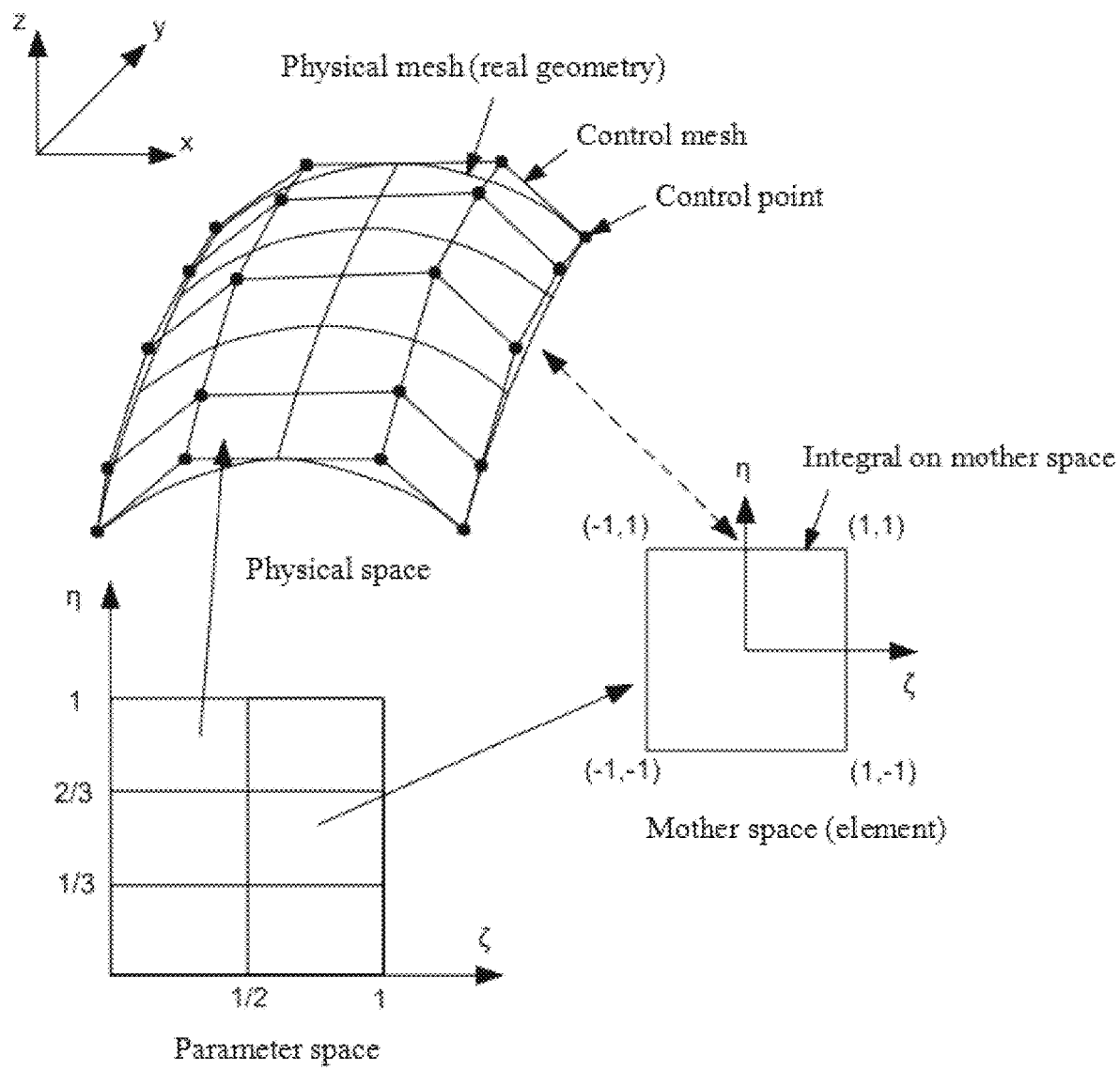
FIG. 3 is a schematic flow chart of space, transformation and numerical integration in isogeometric provided by an embodiment of the present application.

IGA has three kinds of spaces: physical space, mother space and parameter space (FIG. 3); two mesh types: control mesh and physical mesh. Numerical integration in CAE is implemented on the mother space (element) which connects physical space and parameter space through isoparametric transformation.

Considering the three-dimensional space $\Omega$ with the boundary $\Gamma(\Gamma=\Gamma_u+\Gamma_t; \Gamma_u \cap \Gamma_t=0)$, the element stiffness matrix Ke and the element force vector matrix Fe:

$$K_e = \int_{\Omega_e} B^T D B |J_v| d\Omega_e$$

$$F_e = \int_{\Omega_e} R^T b |J_v| d\Omega_e + \int_{\Gamma_e} R^T \bar{t} |J_s| d\Gamma_e,$$

Where B is the displacement differential matrix, D is the fourth-order tensor of elastic modulus, superscript T is matrix transposition, and the three-dimensional volume space is $\Omega$. Jv and Js are; b and $\bar{t}$ are given external force vector; R is the local strain matrix.

(3) The Functional of Nitsche Method May be Abbreviated as:

$$\prod{}^* = -\int_\Gamma R \times (A-G)dS + \frac{r}{2}\int_\Gamma (A-G)^2 dS,$$

where R is the generalized force on the boundary, A is the generalized displacement on the boundary, G is the boundary condition, and r is the stability coefficient.

(4) Derivation of Geometric Nonlinearity

The matrix form of displacement increment of an element may be expressed as:

$$\Delta u = R_e \Delta d_e$$

where $R_e$ is the shape function matrix, $\Delta d_e$ is the displacement matrix of control points:

The displacement at time t is set as $\upsilon$, the strain $\varepsilon$ and the stress $\tau$; at t+$\Delta$t, the displacement is u, the strain is E and the stress is T; the displacement increment is $\Delta u$, the strain increment is $\Delta E$ and the stress increment is $\Delta T$. In the iterative solution process, if the displacement and displacement increment, strain and strain increment, stress and stress increment at time t are known, then the displacement, strain and stress at time t+$\Delta$t are expressed as:

$$u = \upsilon + \Delta u, E = \varepsilon + \Delta E, T = \tau + \Delta T$$

considering that the displacement $\upsilon$ at time t is known and the displacement increment $\Delta u$ is unknown, combined with the definition of Green strain tensor, the strain increment may be expressed as a linear strain increment $E_{IJ}^L$ and a nonlinear strain increment $E_{IJ}^N$, and the linear strain increment may be further decomposed into a first linear strain increment $E_{IJ}^{L1}$ and a second linear strain increment $E_{IJ}^{L2}$, namely $$\Delta E_{IJ} = \Delta E_{IJ}^{L1} + \Delta E_{IJ}^{L2} + \Delta E_{IJ}^N$$

where, $$\Delta E_{IJ}^{L1} = \frac{1}{2}\left(\frac{\partial \Delta u_i}{\partial Y_J} + \frac{\partial \Delta u_j}{\partial Y_I}\right)$$

$$\Delta E_{IJ}^{L2} = \frac{1}{2}\left(\frac{\partial v_k}{\partial Y_I}\frac{\partial \Delta u_k}{\partial Y_J} + \frac{\partial \Delta u_k}{\partial Y_I}\frac{\partial v_k}{\partial Y_J}\right)$$

$$\Delta E_{IJ}^N = \frac{1}{2}\frac{\partial \Delta u_k}{\partial Y_I}\frac{\partial \Delta u_k}{\partial Y_J},$$

the subscripts of v and u are the serial numbers of different elements. When I=J, it still doesn't mean summation, and $Y_I$ is the global coordinate system. When I=1, $Y_I$=X; when I=2, $Y_I$=y; when I=3, $Y_I$=z;

it is known that the first linear strain increment $E^{L1}$ may be expressed as: $\Delta E^{L1} = L \Delta u$, where L is the differential operator, and $\Delta E^{L1} = B_{L1}\Delta d_e$ may be obtained, where $B_{L1}$ is consistent with the strain displacement matrix $B_e$ in linear analysis. Another linear strain increment $E^{L2}$ may be expressed as $\Delta E^{L2} = \Theta \Delta \theta$, where $\Theta$ and $\theta$ are related parameters for calculating the linear strain increment, and G is an auxiliary parameter, and its contents are as follows:

making $$\Theta_I = \left[\frac{\partial v_1}{\partial Y_I} \quad \frac{\partial v_2}{\partial Y_I} \quad \frac{\partial v_3}{\partial Y_I}\right]^T (I=1,2,3)$$

$$\Delta \theta_I = \left[\frac{\partial u_1}{\partial Y_I} \quad \frac{\partial u_2}{\partial Y_I} \quad \frac{\partial u_3}{\partial Y_I}\right]^T (I=1,2,3)$$

So $$\Theta = \begin{bmatrix} (\Theta_1)^T & 0 & 0 \\ 0 & (\Theta_2)^T & 0 \\ 0 & 0 & (\Theta_3)^T \\ (\Theta_2)^T & (\Theta_1)^T & 0 \\ 0 & (\Theta_3)^T & (\Theta_2)^T \\ (\Theta_3)^T & 0 & (\Theta_1)^T \end{bmatrix},$$

then obtaining $\Theta_I = G_I v$ (I=1,2,3)

$\Delta \theta_I = G_I \Delta u$ (I=1,2,3), where $G_I = [G_I^0 \ldots G_I^k \ldots G_I^q]$ $$G_I^k = \begin{bmatrix} \frac{\partial R_k}{\partial Y_I} & 0 & 0 & \frac{\partial \tilde{R}_k}{\partial Y_I}(-{}^0V_{2x}^k) & \frac{\partial \tilde{R}_k}{\partial Y_I}V_{1x}^k \\ 0 & \frac{\partial R_k}{\partial Y_I} & 0 & \frac{\partial \tilde{R}_k}{\partial Y_I}(-{}^0V_{2y}^k) & \frac{\partial \tilde{R}_k}{\partial Y_I}V_{1y}^k \\ 0 & 0 & \frac{\partial R_k}{\partial Y_I} & \frac{\partial \tilde{R}_k}{\partial Y_I}(-{}^0V_{2x}^k) & \frac{\partial \tilde{R}_k}{\partial Y_I}V_{1z}^k \end{bmatrix},$$

where k0, 1, . . . q, q represents the total number of basis functions in an element, and $R_k$ is the k-th basis function in the element. Similarly, the strain increment $E^{L2}$ may be expressed as: $\Delta E^{L2} = B_{L2}\Delta d_e$, so $B_{L2} = \Theta G$, because $B_{L1}$ and $B_{L2}$ have nothing to do with the displacement increment $\Delta u$, both belong to the linear geometric matrix, which may be recorded as $\Delta E^L = (B_{L1} + B_{L2})\Delta d_e$, and the nonlinear strain increment $E^N$ may be written as:

$$\Delta E^N = \frac{1}{2}\Delta \bar{\theta} \Delta \theta,$$

where $$\Delta \bar{\theta} = \begin{bmatrix} (\Delta \theta_1)^T & 0 & 0 \\ 0 & (\Delta \theta_2)^T & 0 \\ 0 & 0 & (\Delta \theta_3)^T \\ (\Delta \theta_2)^T & (\Delta \theta_1)^T & 0 \\ 0 & (\Delta \theta_3)^T & (\Delta \theta_2)^T \\ (\Delta \theta_3)^T & 0 & (\Delta \theta_1)^T \end{bmatrix}$$

obtaining: $\Delta E^N = B^*_N \Delta d_e$, where $$B^*_N = \frac{1}{2}\Delta \bar{\theta} G,$$

because $B^*_N$ is related to the displacement increment $\Delta u$, it is called a nonlinear geometric matrix. The strain-displacement increment is expressed as:

$\Delta E = \Delta E^L + \Delta E^N$, it may be obtained that the stress-displacement increments $\Delta T = C_{sh}\Delta E$, $C_{sh}$ are the global elastic coefficient matrix.

(5) Program Realization Based on NX Software

Further, the implementing of this method and the implementing of program realization in NX software have the following steps.

Step (1): according to the geometric characteristics of the model, the basic function order, node vectors, control point coordinates, weights and other essential element information for establishing the geometric model, the node vectors, element number information, topological relations between elements and nodes, normal vectors of control points and the like are obtained through a design program;

step (2): the element loop is entered to traverse all the elements in the node vectors and calculate the element stiffness matrix in the local coordinate system;

step (3): the loop of Gaussian integral point is entered to take the element stiffness matrix in the local coordinate system at the Gaussian integral point and then calculate the global elastic coefficient matrix Csh, calculate the Jacobi matrix J and then calculate the strain displacement matrix Be, and finally obtain the element stiffness matrix ke in the global Cartesian coordinate system;

step (4): the element tangential stiffness matrix is assembled into the overall stiffness matrix K according to the element connection information; and step (5): considering the nonlinear problems of materials and geometry, a complete nonlinear solution algorithm is constructed by using the incremental step length dynamic calculation mode; the main steps and program design of incremental iteration are as follows:

1): under the premise of meeting the loop condition, according to the set incremental step length or the calculated dynamic incremental step length, the program enters an incremental step loop, and after initializing related variables and matrices, the program enters an iterative loop;

2): in the iterative loop, the stiffness matrix and the initial stress node force matrix in in local coordinate system are calculated element by element and assembled into the corresponding global matrix; in order to eliminate the shear locking effect, it is necessary to calculate the global elastic coefficient matrix, strain displacement matrix, and then obtain the element stiffness matrix and the initial stress node force matrix;

3): according to the element stiffness matrix and the global initial stress node force matrix, the displacement increment is calculated through the stiffness, strain and stress constitutive equations;

4): isogeometric nonlinear iteration is performed to judge whether converging or not; and 5): during the running of the program, when the incremental step length is equal to the maximum load, the iterations is less than the set maximum iterations, and when the incremental step length split times is less than the set maximum split times, the calculation results of the program meet the convergence conditions.

When the running results meet the convergence, the program is finished, and the corresponding model is output, in which the displacement increment at different positions, that is, the ultimate strength heat map, is displayed.

Figure 5:
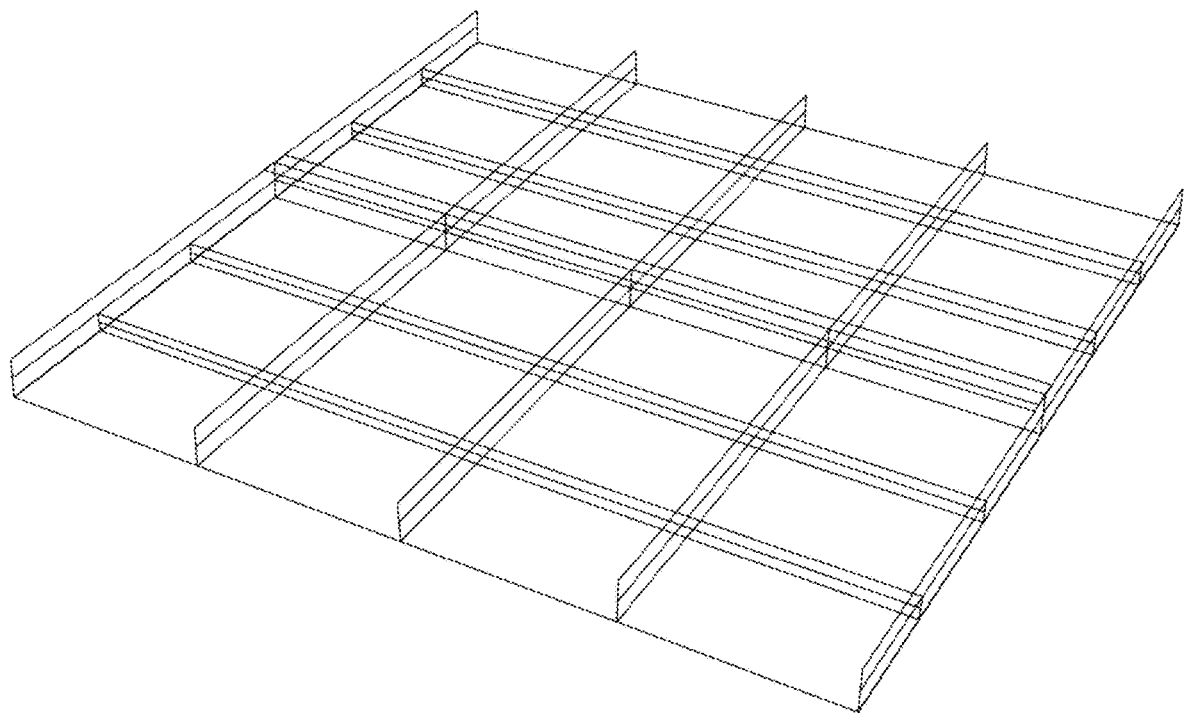
FIG. 5 is a schematic diagram of a ship plate structure model provided by an embodiment of the present application.

Embodiment: This method is verified with a ship plate frame structure (FIG. 5).

The boundary conditions of model simulation calculation are that one end is fixed and the other end is free, and horizontal axial compression load is applied.

Figure 6:
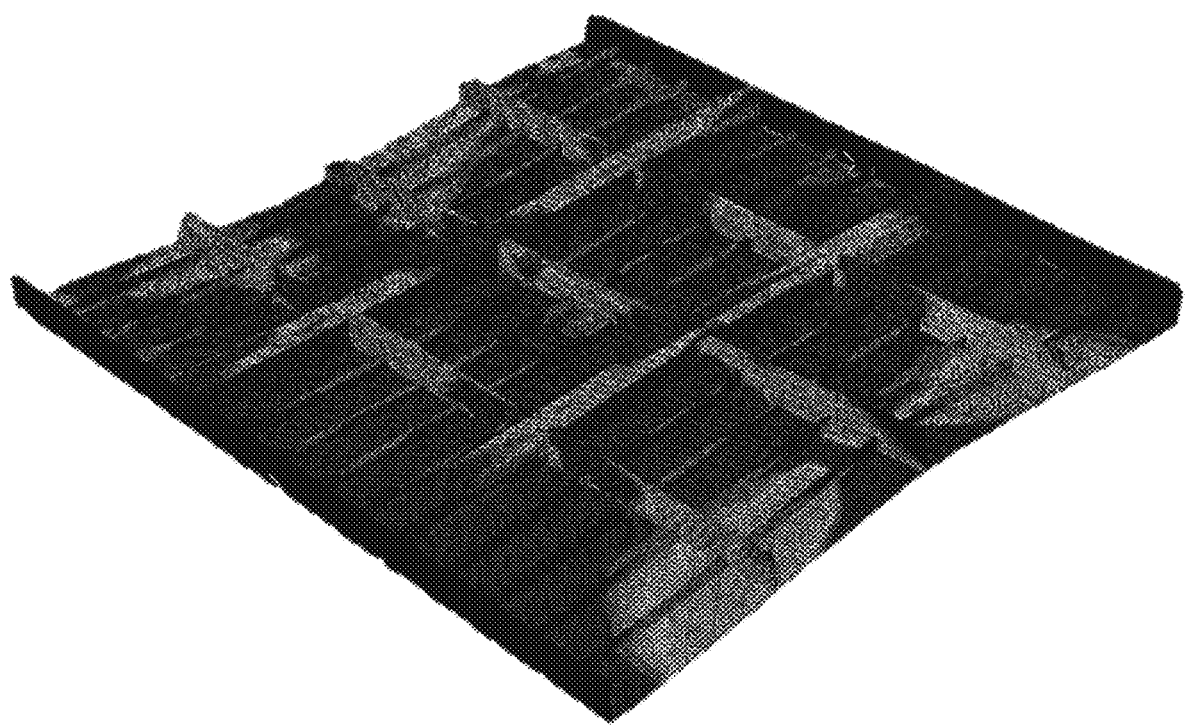
FIG. 6 is a schematic diagram of numerical simulation results provided by an embodiment of the present application.
Figure 7:
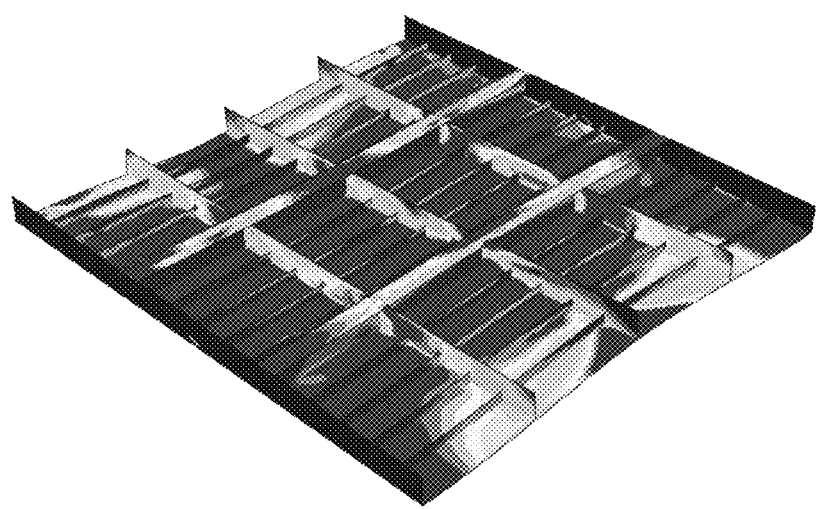
FIG. 7 is a schematic diagram of an analysis result provided by an embodiment of the present application.

FIG. 6 is the result of nonlinear finite element calculation of commercial software ABAQUS;

FIG. 7 is the calculation result of this method; the ultimate strength of different structural positions is shown in the structural model.

Under the same load condition, the results show that the calculation results of this method are in good agreement with those of numerical simulation, which verifies the effectiveness of this method.

The proposed method may be applied to the field of ship engineering design and education and teaching, and the feasibility and practicability of the proposed method are also verified by test cases. The above is only a better and feasible embodiment of the present application, which does not limit the patent scope of the present application, so the protection scope of the present application shall be subject to the scope defined by the present application.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A method for implementing ultimate strength analysis of plate frame structure based on isogeometric analysis, comprising:

according to the plate frame structure, constructing an IGA model, wherein the IGA model comprises several plane shell elements;

carrying out a coordinate transformation on the plane shell elements;

carrying out a weak coupling on boundaries of transformed plane shell elements by a Nitsche method and carrying out a mesh refinement;

setting material properties, loads and boundary conditions of refined plane shell elements, and constructing a nonlinear equation according to setting results; and solving the nonlinear equation by a Newton-Raphson iteration method, and carrying out a simulation analysis by an NX software to obtain an ultimate strength of the plate frame structure;

wherein the coordinate transformation is carried out through four kinds of coordinate systems, comprising global Cartesian coordinate system, local Cartesian coordinate system from control points, parametric coordinate system and local coordinate system at Gaussian integration;

a process of carrying out the simulation analysis by the NX software comprises:

according to the plate frame structure, obtaining element information and design information of a geometric model, wherein the element information of the geometric model comprises an order of basic functions, node vectors, control point coordinates and weights; the design information comprises node vectors, element number information, topological relationship between elements and nodes and normal vectors of the control points;

constructing the geometric model through the element information and the design information, and traversing the elements corresponding to all the node vectors of the geometric model circularly, and calculating an element stiffness matrix in a corresponding local Cartesian coordinate system;

obtaining a local coordinate system of Gaussian integral points of the nodes, calculating a global elastic coefficient matrix, obtaining a Jacobi matrix corresponding to the nodes, calculating a strain displacement matrix according to the global elastic coefficient matrix and the Jacobi matrix, and calculating and obtaining an element stiffness matrix in the global Cartesian coordinate system according to the strain displacement matrix;

connecting and assembling the element stiffness matrix in the global Cartesian coordinate system into an overall stiffness matrix; and according to a material and the nonlinear equation of the plate frame structure, constructing a nonlinear solution algorithm by using an incremental step length dynamic calculation mode, and obtaining the ultimate strength of the plate frame structure by solving the nonlinear equation through the nonlinear solution algorithm;

the incremental step length dynamic calculation mode is:

according to an incremental step length, carrying out an incremental step length loop, then initializing related variables and matrices in an operation calculation of the NX software, and entering an iterative loop, wherein the incremental step length is obtained by presetting or calculating;

in the iterative loop, calculating the element stiffness matrix and an initial stress node force matrix in the global Cartesian coordinate system one by one in the geometric model, and connecting and assembling into the overall stiffness matrix and a global initial stress node force matrix respectively; wherein in a calculation process of the element stiffness matrix and the initial stress node force matrix, obtaining the element stiffness matrix and the initial stress node force matrix in the global Cartesian coordinate system by using reduced integral and based on the global elastic coefficient matrix and the strain displacement matrix obtained by the calculation;

according to the overall stiffness matrix and the global initial stress node force matrix, calculating displacement increments;

carrying out an isogeometric nonlinear iteration based on the nonlinear equation to judge whether convergence conditions are met, and if the convergence conditions are met, outputting all the displacement increments, namely the ultimate strength of the plate frame structure;

wherein the convergence conditions are: the incremental step length is equal to a maximum load, an iterations is less than a maximum iterations, and an incremental step length split time is less than a maximum split time.

2. The method for implementing the ultimate strength analysis of the plate frame structure according to claim 1, wherein:

constructing the IGA model based on a B-spline curve, wherein the plane shell elements are constructed based on a Reissner-Mindlin shell theory;

wherein the B-spline curve is defined as:

$$C(\xi) = \frac{\sum_{i=1}^{n} B_{i,p}(\xi)\omega_i P_i}{\sum_{i=1}^{n} B_{i,p}(\xi)\omega_i} = \sum_{i=1}^{n} N_{i,p}(\xi)\omega_i P_i \quad 0 \leq \xi \leq 1$$

wherein $P_i$(i=1, 2, . . . , n) represents coordinates of a series of the control points, and $\omega_i$ represents a corresponding control point weight; a geometric shape of a structure is modified by changing the coordinates or weights of the control points; $B_{i,p}(\xi)$ and $N_{i,p}(\xi)$ represent spline basis functions in a node vector $\Xi=\{\xi_1, \xi_2, \ldots, \xi_m\}$ respectively, and the node vector $\Xi=\{\xi_1, \xi_2, \ldots, \xi_m\}$ is a set of non-decreasing real number sequence; and the plane shell elements comprise torsional degrees of freedom and have 6 degrees of freedom.

3. The method for implementing the ultimate strength analysis of the plate frame structure according to claim 1, wherein:

when the boundary conditions are imposed by the Nitsche method, carrying out a correction by setting Lagrange multiplier and adding a penalty function, wherein the functional expression of the Nitsche method is defined as:

$$\prod{}^* = -\int_\Gamma R \times (A - G) dS + \frac{r}{2} \int_\Gamma (A - G)^2 dS;$$

wherein, R is generalized force on the boundaries, A is generalized displacement on the boundaries, G is boundary condition, r is stability coefficient, $\Gamma$ is coupling boundary, and S is element area.

4. The method for implementing the ultimate strength analysis of the plate frame structure according to claim 1, wherein:

the mesh refinement adopts h mesh refinement and is realized by adding the control points.

5. The method for implementing the ultimate strength analysis of the plate frame structure according to claim 1, wherein:

the nonlinear equation comprises:
a unit displacement increment is: $\Delta u = R_e \Delta d_e$;
$R_e$ is a shape function matrix, and $\Delta d_e$ is a displacement matrix of the control points:
a strain increment is $\Delta E = \Delta E^L + \Delta E^N$;
wherein $\Delta E^L$ is a linear strain increment and $\Delta E^N$ is a nonlinear strain increment; and
a stress increment is $\Delta T = C_{sh} \Delta E$, and $C_{sh}$ is the global elastic coefficient matrix.

6. The method for implementing the ultimate strength analysis of the plate frame structure according to claim 1, wherein:

when a boundary condition is $\Gamma$ in a three-dimensional space $\Omega$, a corresponding element stiffness matrix Ke and an element force vector matrix Fe are:

$$K_e = \int_{\Omega_e} B^T DB |J_v| d\Omega_e$$

$$F_e = \int_{\Omega_e} R^T b |J_v| d\Omega_e + \int_{\Gamma_e} R^T \bar{t} |J_s| D\Gamma_e$$

wherein B is a displacement differential matrix, R is a local strain matrix, D is a fourth-order tensor of elastic modulus, $B^T$ and $R^T$ respectively denote a matrix transposition of the matrices B and R, and Jv and Js are Jacobi matrices of a body and a surface respectively, and b and t are given external force vectors.

\* \* \* \* \*